United States Patent
Beaumont et al.

(10) Patent No.: US 7,262,382 B2
(45) Date of Patent: Aug. 28, 2007

(54) PROCESS OF FORMING CONICAL HOLES WITH AN ELECTRICAL DISCHARGE MACHINING SYSTEM

(75) Inventors: Edward L. Beaumont, Milford, OH (US); Donald Rowland, Tipton, IN (US)

(73) Assignee: Beaumont Machine Repair, Inc., Milford, OH (US)

( * ) Notice: Subject to any disclaimer, the term of this patent is extended or adjusted under 35 U.S.C. 154(b) by 0 days.

(21) Appl. No.: 11/252,977

(22) Filed: Oct. 18, 2005
(Under 37 CFR 1.47)

(65) Prior Publication Data

US 2006/0231530 A1    Oct. 19, 2006

Related U.S. Application Data

(60) Provisional application No. 60/670,786, filed on Apr. 13, 2005.

(51) Int. Cl.
*B23H 1/04* (2006.01)
*B23H 7/18* (2006.01)
*B23H 9/14* (2006.01)

(52) U.S. Cl. .............................. 219/69.15; 219/69.17; 219/69.2

(58) Field of Classification Search ............. 219/69.15, 219/69.17, 69.2, 69.16; 205/640, 646; 700/162
See application file for complete search history.

(56) References Cited

U.S. PATENT DOCUMENTS

| | | | | | |
|---|---|---|---|---|---|
| 3,056,014 | A | * | 9/1962 | Hulley et al. ............ | 219/69.15 |
| 3,609,280 | A | * | 9/1971 | Kholodnov .............. | 219/69.17 |
| 4,197,443 | A | | 4/1980 | Sidenstick | |
| 4,596,066 | A | * | 6/1986 | Inoue ...................... | 219/69.15 |
| 4,762,464 | A | * | 8/1988 | Vertz et al. ................ | 219/69.1 |
| 4,850,147 | A | | 7/1989 | Baker | |
| 5,051,912 | A | * | 9/1991 | Johanson et al. .......... | 700/162 |
| 5,589,086 | A | * | 12/1996 | Sawada et al. ......... | 219/69.16 |
| 5,605,639 | A | * | 2/1997 | Banks et al. ............ | 219/69.17 |
| 5,976,347 | A | * | 11/1999 | Wakabayashi et al. ...... | 205/640 |
| 6,566,623 | B2 | * | 5/2003 | McPhillips ............... | 219/69.17 |
| 6,717,094 | B2 | | 4/2004 | Beaumont | |
| 6,759,621 | B2 | * | 7/2004 | Varin ...................... | 219/69.15 |
| 6,817,132 | B1 | | 11/2004 | Sirois | |
| 2006/0054598 | A1 | * | 3/2006 | Awakura ..................... | 219/50 |

FOREIGN PATENT DOCUMENTS

JP    2004-181605 A    *    7/2004

* cited by examiner

*Primary Examiner*—Geoffrey S. Evans
(74) *Attorney, Agent, or Firm*—Dinsmore & Shohl LLP

(57) ABSTRACT

An electrical discharge machine is configured to (i) machine at least a portion of a workpiece through electrical discharge between the workpiece and a first machining electrode aligned by the electrode guide; (ii) generate a dressed machining electrode by engaging a machining electrode aligned by the electrode guide with the electrode dresser; and (iii) machine at least a portion of a workpiece through electrical discharge between the workpiece and the dressed machining electrode. Additional electrical discharge machines and methods of machining are provided.

23 Claims, 4 Drawing Sheets

PROCESS OF FORMING CONICAL HOLES WITH AN ELECTRICAL DISCHARGE MACHINING SYSTEM

CROSS-REFERENCE TO RELATED APPLICATIONS

This application claims the benefit of U.S. Provisional Application Ser. No. 60/670,786 (BEU 0003 MA), filed Apr. 13, 2005.

BACKGROUND OF THE INVENTION

The present invention relates to the design and operation of electrical discharge machines. For the sake of brevity, the detailed description of the present invention does not present a comprehensive description of the basic operating principles or components of electrical discharge machines. Rather, reference is made herein to the wealth of teachings on the subject as presented in the patent literature. Particular reference is made herein to the disclosure of U.S. Pat. No. 6,717,094 (Beaumont), issued on Apr. 6, 2004, the disclosure of which is incorporated herein by reference.

BRIEF SUMMARY OF THE INVENTION

According to the present invention, electrical discharge machines are provided for forming a variety of holes and machined surface profiles including, but not limited to, diffused cooling holes for hollow gas turbine components and other holes including conical portions.

In accordance with one embodiment of the present invention, an electrical discharge machine is provided comprising a machining electrode assembly, an electrode dresser, and a workpiece support. The machining electrode assembly comprises an electrode guide configured to align a machining tip of a machining electrode along a machining axis of the electrical discharge machine. The electrical discharge machine is configured to define a workpiece machining envelope encompassing workpiece machining points at which a machining electrode aligned by the electrode guide is able to machine at least a portion of a workpiece supported by the workpiece support. The workpiece machining points are defined through movement of an aligned machining electrode, the workpiece, or both the machining electrode and the workpiece. The electrical discharge machine is configured to direct a dielectric fluid through an interior fluid passage of an aligned machining electrode in the direction of a machining tip of the machining electrode. The electrical discharge machine is configured to engage an aligned machining electrode and the electrode dresser and execute a dressing operation upon a machining tip of an aligned machining electrode.

In accordance with another embodiment of the present invention, an electrical discharge machine is configured to (i) machine at least a portion of a workpiece through electrical discharge between the workpiece and a first machining electrode aligned by the electrode guide; (ii) generate a dressed machining electrode by engaging a machining electrode aligned by the electrode guide with the electrode dresser; and (iii) machine at least a portion of a workpiece through electrical discharge between the workpiece and the dressed machining electrode.

In accordance with yet another embodiment of the present invention, an electrical discharge machine is provided comprising a machining electrode assembly and a tool change station, wherein the electrical discharge machine is configured to machine at least a portion of a workpiece through electrical discharge between the workpiece and a first machining electrode and between the workpiece and the dressed machining electrode.

In accordance with yet another embodiment of the present invention, a method of operating an electrical discharge machine is provided wherein a suitable machining electrode holder is selected from a plurality of electrode holders, each holding individual machining electrodes and each being configured to be releasably engaged to a rotary drive portion of the electrical discharge machine. At least one of the machining electrodes comprises a dressed machining electrode. At least a portion of a workpiece is machined through electrical discharge between the workpiece and a first machining electrode and at least a portion of the workpiece is machined through electrical discharge between the workpiece and the dressed machining electrode.

Accordingly, it is an object of the present invention to provide improvements in electrical discharge machining. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
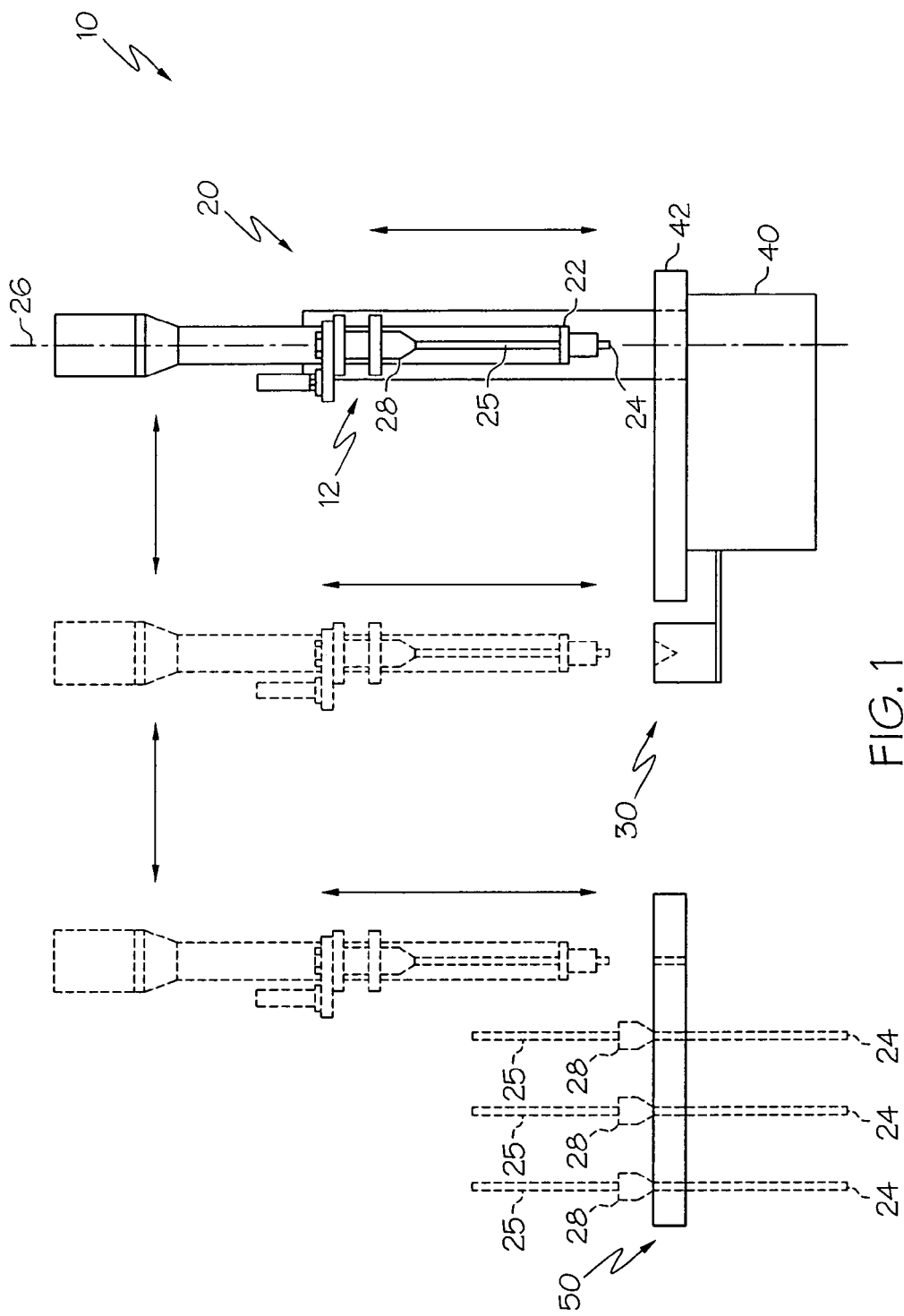
FIGS. 1 and 2 illustrate an electrical discharge machine according to one embodiment of the present invention.
Figure 2:
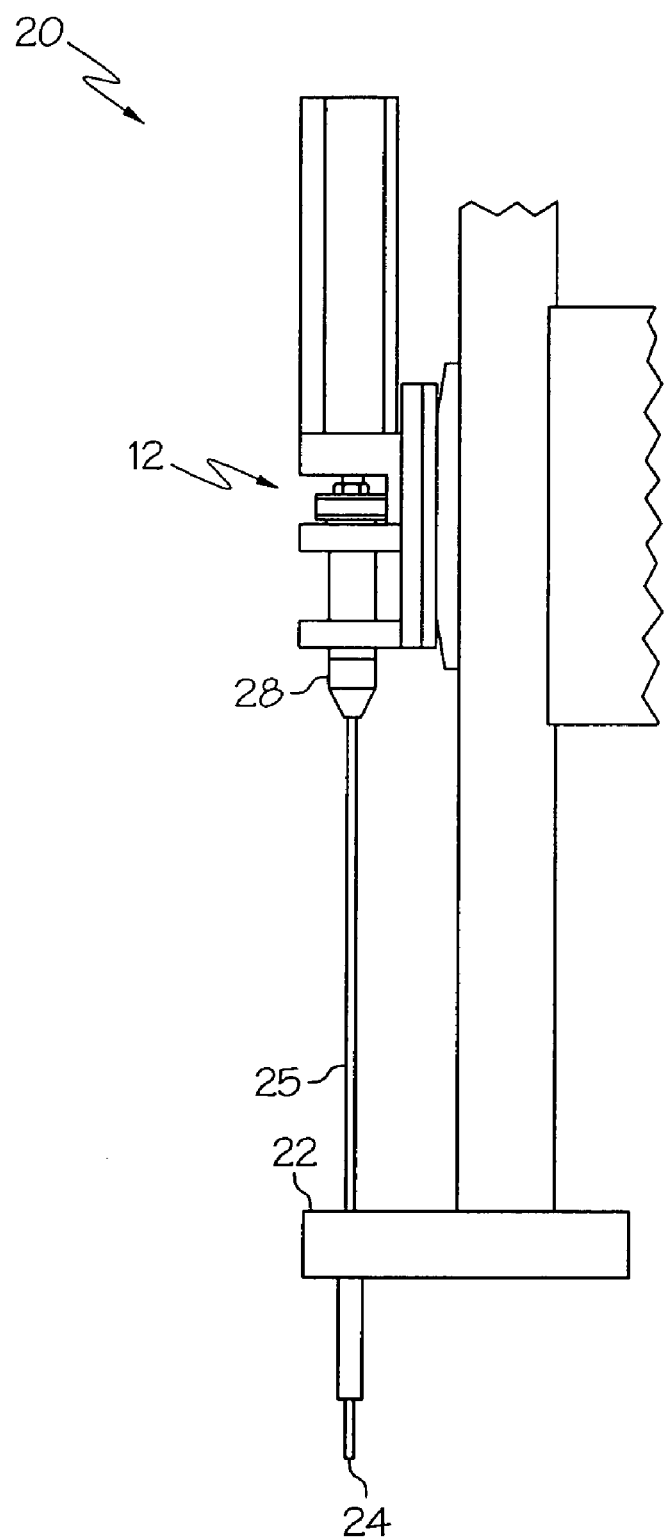

The concepts of the present invention may be illustrated with initial reference to FIGS. 1 and 2, where an electrical discharge machine 10 is illustrated comprising a machining electrode assembly 20, an electrode dresser 30, a workpiece support 40, and a tool change station 50. As is noted above, the present description is not intended to present a detailed illustration of the basic operating principles or components of electrical discharge machines. For the purposes of describing the present invention, it is sufficient to note that the machining electrode assembly 20 typically comprises an electrode guide 22 configured to align a machining tip 24 of a machining electrode 25 along a machining axis 26 of the electrical discharge machine 10.

The machining electrode assembly 20 and workpiece support 40 are configured such that the electrical discharge machine 10 defines a workpiece machining envelope encompassing a set of points at which the machining electrode 25 is able to machine at least a portion of a workpiece 42 supported by the workpiece support 40. These workpiece machining points can be defined through movement of the electrode assembly 20 and machining electrode 25 via a suitable actuator. Alternatively, or additionally, the machining points can be defined by providing a controllable workpiece support 40 that is configured as a workpiece stage that can be positioned in through multiple degrees of freedom within and orthogonal to the plane of the workpiece 42. It is understood that suitable actuators for creating relative movement between the workpiece 42 and the machining electrode 25 may comprise any conventional or yet-to-be developed actuator, including but not limited to linear single axis actuators, rotational actuators, multi-axis actuators, etc., without departing from the scope and spirit of the present invention.

Although not illustrated with particularity in FIGS. 1 and 2, it is noted that electrical discharge machines according to the present invention often utilize dielectric fluid flow to enhance EDM operations. A detailed description of such operations is presented in the above-noted U.S. patent. For the purposes of describing the present invention, it is sufficient to note that electrical discharge machines 10 according to the present invention may be configured to direct a dielectric fluid through a generally longitudinal interior fluid passage of the machining electrode 25 in the direction of the machining tip 24 of the electrode 25. Machining electrodes 25 according to the present invention may be formed of a variety of suitable materials including, but not limited to, brass or copper alloys.

Figure 5:
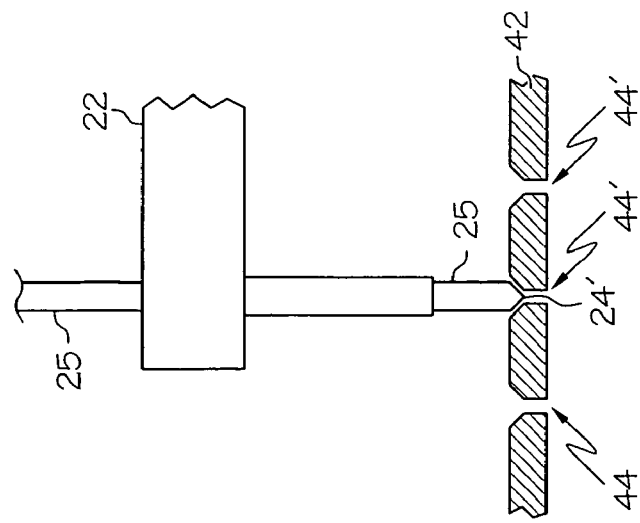
FIGS. 3-5 illustrate a machining operation according to the present invention.
Figure 4:
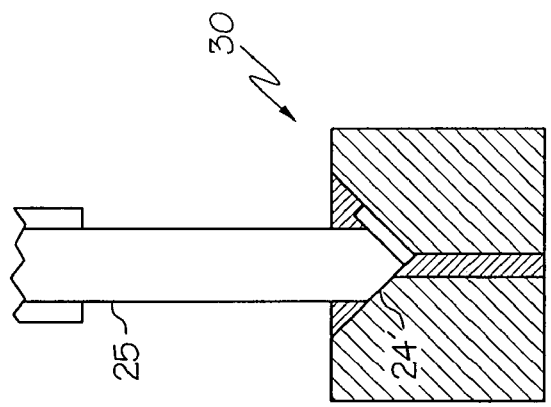
Figure 3:
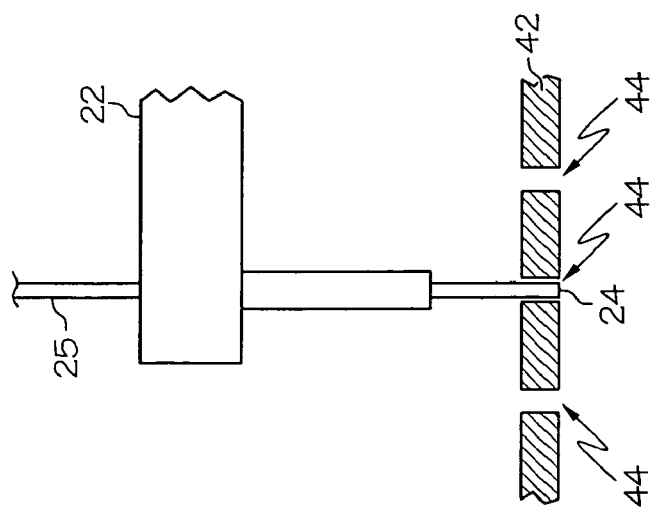

According to one operational sequence according to the present invention, as is illustrated in FIGS. 3-5, enhanced electrical discharge machining can be achieved by directing initial workpiece machining at a plurality of machining points 44 across a workpiece 42 with a first type of electrode machining tip 24 (see FIG. 3). Position coordinates corresponding to these workpiece machining points are committed to a suitable data storage device. Next, the electrical discharge machine 10, which has been configured to engage particular machining electrodes 25 with the electrode dresser 30, executes a dressing operation upon the machining tip 24' of a machining electrode 25' (see FIG. 4). Subsequently, dressed electrode workpiece machining is directed at all or some of the stored workpiece machining points with the dressed electrode machining tip 24' by recalling the stored position coordinates (see FIG. 5).

Because the dressed electrode machining tip 24' is distinct from the machining tip 24 of the first type of electrode, the profile of the resulting machined section at the workpiece machining point 44' defines a compound profile representing the profile of the initial and dressed machining tips 24, 24'. To this end, dressed electrode workpiece machining according to the present invention can be directed to complement the initial workpiece machining such that machined portions of the workpiece machining points are representative of the first electrode machining tip 24 and the dressed electrode machining tip 24'. For example, in the illustrated embodiment, the initial machining electrode 25 defines a cross sectional dimension suited for machining a hole defining a diameter substantially smaller than that which is created by the subsequent electrode. In addition, the profile of the machining tip 24 of the initial machining electrode 25 is substantially columnar while the profile of the dressed electrode tip 24' is substantially conical. The resulting profile, illustrated in FIG. 5, is particularly well-suited for the creation of diffused cooling holes for hollow gas turbine components.

Electrical discharge machines 10 according to the present invention can be configured to allow for replacement of the machining electrode prior to initiation of the dressing operation. The machining electrode 25 can be replaced manually or as part of an automated tool change procedure. Where an automated tool change procedure is preferred, the electrical discharge machine 10 may comprise a tool change station 50 configured for automated exchange of machining electrodes 25. The machining electrodes 25 at the tool change station 50 can be configured to define a plurality of distinct cross-sectional electrode dimensions to enhance machining versatility.

As is illustrated in FIGS. 1 and 2, the electrical discharge machine 10 comprises a rotary drive portion 12 configured to impart rotary motion to the electrode 25 during machining. The electrical discharge machine 10 can be provided with an electrode holder 28 that is configured to releasably engage the rotary drive portion 12 to facilitate convenient replacement of the electrode 25 by selecting one of a plurality of electrode holders 28, each holding individual machining electrodes 25, and each being configured to releasably engage the rotary drive portion 12. In the illustrated embodiment, the electrode holders 28 and corresponding electrodes 25 are held in the tool change station 50.

It is contemplated that the electrode dresser 30 can be configured to impart a variety of profiles upon a machining tip of an aligned machining electrode 25. For example, referring to FIGS. 6 and 7, it is noted that a dressed electrode tip 24' can comprise a profile that is symmetrical about a rotational axis, i.e., a complete or truncated cone (see FIG. 6), or a profile that is asymmetrical, i.e., a one-sided wedge (see FIG. 7). For profiles that are symmetrical about a rotational axis, the electrode dresser 30 preferably comprises a passive dressing mechanism, e.g., a stationary machining bit, configured to cooperate with rotation of the machining electrode. For other type of profiles, it may be best to configure the electrode dresser as an active dressing mechanism, e.g., a rotating machining element, configured to dress a rotating or non-rotating machining electrode.

Figure 7:
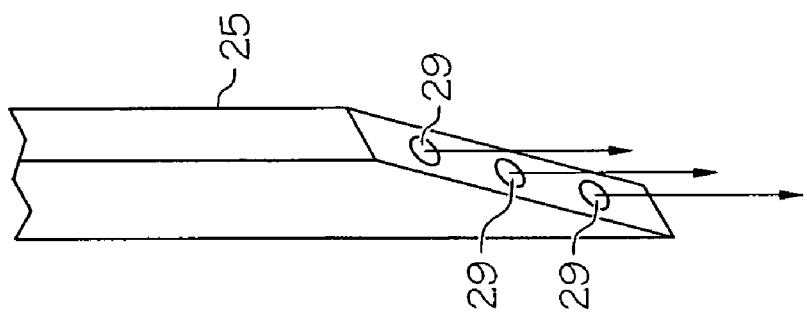
FIGS. 6 and 7 illustrate machining electrodes according to the present invention.
Figure 6:
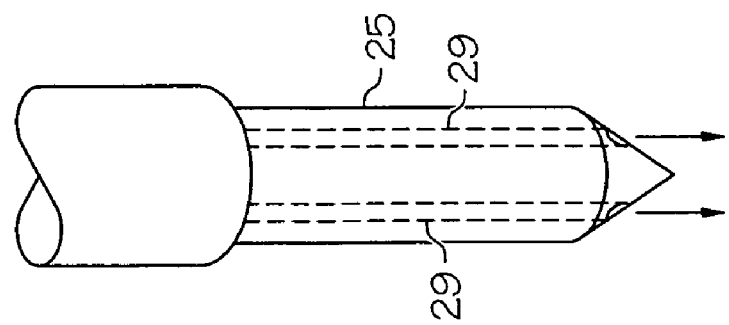

Referring further to FIGS. 6 and 7, it is noted that electrical discharge machines 10 according to the present invention can be configured to direct a dielectric fluid through interior fluid passages 29 formed in the machining electrodes 25, as is illustrated by the directional arrows of FIGS. 6 and 7. This fluid can be directed with sufficient pressure to align the machining electrode 25 along the machining axis of the electrode assembly 20 to enhance the precision of the machining operation.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. More specifically, although some aspects of the present invention are identified herein as preferred or particularly advantageous, it is contemplated that the present invention is not necessarily limited to these preferred aspects of the invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. For example, although the present invention is described in the context of the formation of diffused cooling holes for hollow gas turbine components, it is understood that the concepts of the present invention will enjoy broad applicability to electrical discharge machining in general. It is also understood that electrical discharge machines according to the present invention may be configured to hold particular machining electrodes at a variety of angles relative to the workpiece while advancing or retracting the electrode during machining.

What is claimed is:

1. An electrical discharge machine comprising a machining electrode assembly, an electrode dresser, a controller, and a workpiece support, wherein:
   said machining electrode assembly comprises an electrode guide configured to align a machining tip of a machining electrode along a machining axis of said electrical discharge machine;
   said electrical discharge machine is configured to define a workpiece machining envelope encompassing workpiece machining points at which a machining electrode aligned by said electrode guide is able to machine at least a portion of a workpiece supported by said workpiece support;
   said workpiece machining points are defined through movement of an aligned machining electrode, said workpiece, or both said machining electrode and said workpiece;
   said electrical discharge machine is configured to direct a dielectric fluid through an interior fluid passage of an aligned machining electrode in the direction of a machining tip of said machining electrode;
   said electrical discharge machine is configured to engage an aligned machining electrode and said electrode dresser and execute a dressing operation upon a machining tip of said aligned machining electrode;
   said dressing operation is executed so as to modify the profile of said machining tip to an extent sufficient to enable dressed workpiece machining by said modified machining tip distinct from initial workpiece machining by said aligned machining electrode prior to said dressing operation; and
   said controller is programmed to:
      direct said initial workpiece machining at a plurality of said workpiece machining points,
      direct storage of position coordinates corresponding to said plurality of workpiece machining points, and
      direct said dressed workpiece machining at said plurality of stored workpiece machining points with said modified machining tip by recalling said stored position coordinates.

2. An electrical discharge machine as claimed in claim 1 wherein said dressed workpiece machining is directed to complement said initial workpiece machining such that machined portions of said workpiece machining points are representative of said aligned machining electrode prior to said dressing operation and said modified machining tip.

3. An electrical discharge machine as claimed in claim 1 wherein said electrical discharge machine allows for replacement of said machining electrodes.

4. An electrical discharge machine as claimed in claim 3 wherein said replacement of said machining electrodes comprises a manual tool change or an automated tool change.

5. An electrical discharge machine as claimed in claim 4 wherein said electrical discharge machine comprises a tool change station and is configured for automated exchange of said machining electrodes at said tool change station.

6. An electrical discharge machine as claimed in claim 1 wherein said electrical discharge machine is configured to direct said dielectric fluid through said interior fluid passage with sufficient pressure to align, along said machining axis, a machining electrode guided by said electrode guide.

7. An electrical discharge machine as claimed in claim 1 wherein:
   said electrode dresser is configured to impart a substantially conical profile upon a machining tip of an aligned machining electrode; and
   said conical profile comprises a complete cone or truncated cone.

8. An electrical discharge machine as claimed in claim 1 wherein said electrode dresser comprises a passive dressing mechanism configured to cooperate with rotation of an aligned machining electrode.

9. An electrical discharge machine as claimed in claim 1 wherein said electrode dresser comprises an active dressing mechanism configured to dress a rotating or non-rotating machining electrode.

10. An electrical discharge machine as claimed in claim 1 wherein said electrode dresser and said aligned machining electrode to be dressed are configured such that said modified machining tip comprises at least one fluid outlet defined by said interior fluid passage.

11. An electrical discharge machine as claimed in claim 1 wherein said electrical discharge machine comprises a tool change station.

12. An electrical discharge machine as claimed in claim 11 wherein said tool change station comprises a plurality of machining electrodes suitable for use in said electrical discharge machine.

13. An electrical discharge machine as claimed in claim 12 wherein said plurality of machining electrodes define a plurality of distinct cross-sectional electrode dimensions.

14. An electrical discharge machine as claimed in claim 11 wherein said electrical discharge machine is configured for automated exchange of machining electrodes at said tool change station.

15. An electrical discharge machine as claimed in claim 1 wherein said electrical discharge machine further comprises an electrode holder configured to be releasably engaged to a rotary drive portion of said electrical discharge machine.

16. An electrical discharge machine as claimed in claim 15 wherein said electrical discharge machine further comprises a plurality of electrode holders, each holding individual machining electrodes, and each being configured to be releasably engaged to said rotary drive portion of said electrical discharge machine.

17. An electrical discharge machine as claimed in claim 16 wherein said electrical discharge machine comprises a tool change station comprising a plurality of said electrode holders.

18. An electrical discharge machine as claimed in claim 17 wherein said electrical discharge machine is configured to selectively engage individual electrode holders from said tool change station with said rotary drive portion of said electrical discharge machine.

19. An electrical discharge machine as claimed in claim 1 wherein said electrical discharge machine comprises a plurality of machining electrodes, at least one of which defines a cross sectional dimension suited for machining a hole defining a first diameter, and at least another of which defines a cross sectional dimension suitable for machining a hole defining a second diameter substantially larger than said first diameter.

20. An electrical discharge machine as claimed in claim 1 wherein said electrical discharge machine comprises a brass alloy machining electrode or a copper alloy machining electrode.

21. An electrical discharge machine comprising:
   a machining electrode assembly comprising an electrode guide configured to align a machining tip of a machining electrode along a machining axis of said electrical discharge machine; and
   a tool change station comprising a plurality of electrode holders, each holding individual machining electrodes and each being configured to be releasably engaged to a rotary drive portion of said electrical discharge machine, wherein
      at least one of said machining electrodes comprises a first machining electrode defining a machining tip configured for formation of a machined hole in a workpiece,
      at least one of said machining electrodes comprises a dressed machining electrode defining a machining tip configured for formation of a diffuser portion of said machined hole characterized by cross sectional dimensions exceeding those of said machined hole, and
      said electrical discharge machine is configured to:
         direct said first machining electrode in formation of said machined hole in said workpiece,
         direct storage of position coordinates corresponding to said formation of said machined hole by said first machining electrode, and
         direct said dressed machining electrode to said stored position coordinates in formation of said diffuser portion of said machined hole by recalling said stored position coordinates.

22. A method of operating an electrical discharge machine comprising a machining electrode assembly comprising an electrode guide configured to align a machining tip of a machining electrode along a machining axis of said electrical discharge machine, said method comprising:
   selecting a suitable machining electrode holder from a plurality of electrode holders, each holding individual machining electrodes and each being configured to be releasably engaged to a rotary drive portion of said electrical discharge machine, wherein
      at least one of said machining electrodes comprises a first machining electrode defining a machining tip configured for formation of a machined hole in a workpiece, and
      at least one of said machining electrodes comprises a dressed machining electrode defining a machining tip configured for formation of a diffuser portion of said machined hole characterized by cross sectional dimensions exceeding those of said machined hole;
   machining at least a portion of a workpiece through electrical discharge between said workpiece and said first machining electrode such that said first machining electrode machines a machined hole in said workpiece;
   storing position coordinates corresponding to said formation of said machined hole by said first machining electrode; and
   machining said machined hole in said workpiece through electrical discharge between said workpiece and said dressed machining electrode by recalling said stored position coordinates such that said dressed machining electrode machines said diffuser portion of said machined hole.

23. A method of operating an electrical discharge machine as claimed in claim 22 wherein:
   said machining with said first machining electrode is executed prior to machining with said dressed machining electrode; or
   said machining with said dressed machining electrode is executed prior to machining with said dressed machining electrode.

* * * * *